(No Model.)

C. E. PAGE.
BICYCLE SADDLE.

No. 571,388. Patented Nov. 17, 1896.

Witnesses
John C. Wilson.
D. H. Blakelock.

Inventor
C. E. Page,
by Whitman & Wilkinson,
Attorneys

UNITED STATES PATENT OFFICE.

CHARLES E. PAGE, OF DENVER, COLORADO, ASSIGNOR OF THREE-FIFTHS TO CARL A. FREEMAN, OF SAME PLACE.

BICYCLE-SADDLE.

SPECIFICATION forming part of Letters Patent No. 571,388, dated November 17, 1896.

Application filed December 30, 1895. Serial No. 573,747. (No model.)

*To all whom it may concern:*

Be it known that I, CHARLES E. PAGE, a citizen of the United States, residing at Denver, in the county of Arapahoe and State of Colorado, have invented certain new and useful Improvements in Bicycle-Saddles; and I do hereby declare the following to be a full, clear, and exact description of the invention, such as will enable others skilled in the art to which it appertains to make and use the same.

My invention relates to improvements in saddles for bicycles and other like vehicles propelled by the feet; and it consists of certain novel features and combinations hereinafter described and claimed.

My invention will be understood by reference to the accompanying drawings, wherein the same parts are indicated by the same letters.

Figure 1:
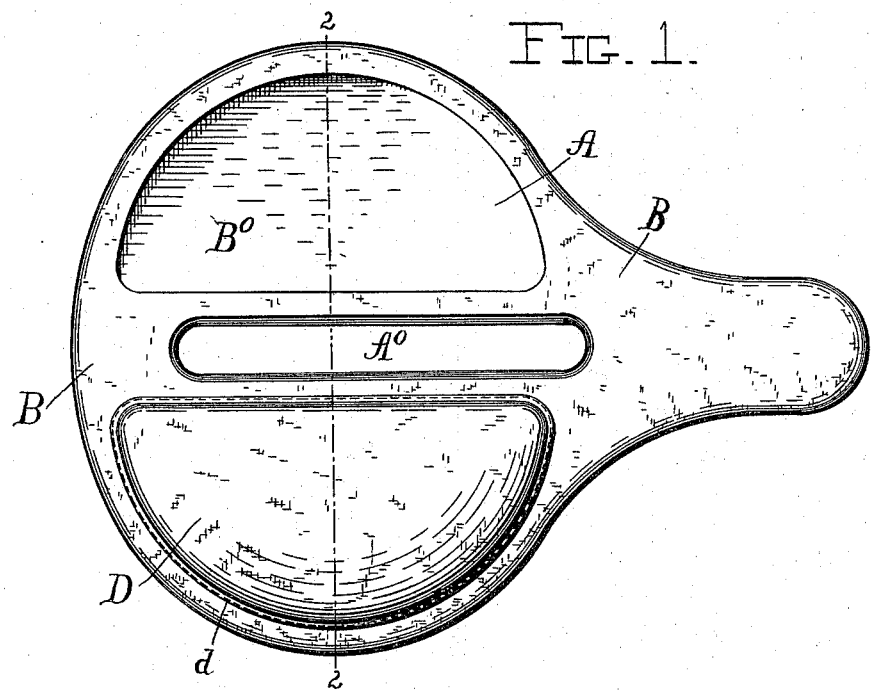
Figure 2:
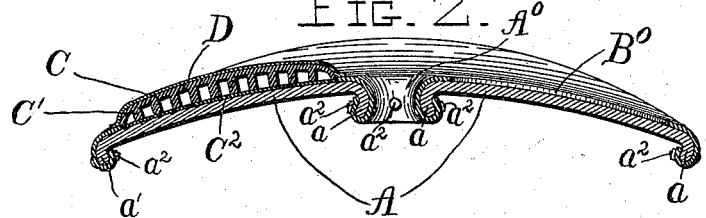
Figure 3:
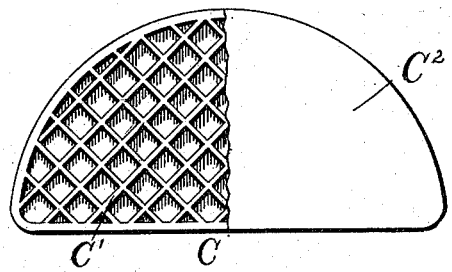

Figure 1 is a top plan view of a saddle constructed according to my invention, one of the cushion-pads and the leather cap covering same being removed to illustrate the manner of cutting the leather covering for the metal frame of the seat. Fig. 2 is a section taken on the line 2 2 of Fig. 1 and looking in the direction of the back of the saddle; and Fig. 3 is a bottom plan view of the rubber cushion, part of the lower covering being broken away to show the construction of the cushion.

A represents the frame or body of the saddle, which is made preferably of metal and is cut away along its central portion, as at $A^0$, forming the ribs or flanges $a$, which are bent downward and serve to strengthen the saddle longitudinally. The outer edges of the frame A are also bent downward to form the rib or flange $a'$, as seen most clearly in Fig. 2.

B represents the cover for the frame, which cover is made of leather or other suitable material and is secured upon the frame of the saddle by means of small bolts or rivets $a^2$, which pass through the edge of the cover B and through the ribs or flanges $a$ and $a'$ on the body A. On either side of the seat portion of the saddle the cover is cut away, as at $B^0$, to receive the pads hereinafter described.

C represents the cushion-pads, which are made, preferably, of rubber and are provided with cross-ribs $C'$ and bottom covering $C^2$. These pads or cushions fit in the cut-away portions of the seat-cover and rest upon the top of the frame A, as seen to the left in Fig. 2. For holding the said pads in place I provide caps D, of leather or other suitable material, which fit snugly over the pads C and just cover the cut-away portions $B^0$ of the seat-cover and are secured to the said cover by means of stitches or in any other suitable manner, as shown in Figs. 1 and 2.

The saddle may be of any suitable or desirable shape and may be mounted upon the bicycle or other cycle in any suitable or desired manner.

It will be seen that I provide a neat, cheap, and exceedingly durable bicycle-saddle, which will not lose its shape from use, as do most of the saddles now in use, and which will at the same time be sufficiently soft to make a comfortable seat for the rider.

Having thus described my invention, what I claim, and desire to secure by Letters Patent of the United States, is—

In a bicycle-saddle, the combination with the metal frame A having central slot $A^0$ with a downwardly-extending flange or rib $a$ around said slot; and the downwardly-extending rib or flange $a'$ around the periphery of said metal frame, said ribs or flanges being perforated at intervals for the passage of suitable fastenings for the cover of said frame; of the flexible cover B fitting over said frame, slotted to correspond with the slot in said metal frame, secured to the ribs $a$ and $a'$, and cut away at $B^0$ on either side of the said slot to form seats for the reception of pads; a pair of rubber pads each consisting of a semicircular concave plate having cross-ribs on the concave side thereof, and a covering for said ribs, said pads fitting in said apertures in said cover and resting upon said metal frame; and a pair of caps D of leather or like material fitting over said pads, and secured at their edges to said cover, substantially as described.

In testimony whereof I affix my signature in presence of two witnesses.

CHARLES E. PAGE.

Witnesses:
C. A. FREEMAN,
JAMES H. THOMAS.